(12) United States Patent
Sohi et al.

(10) Patent No.: US 12,538,179 B2
(45) Date of Patent: *Jan. 27, 2026

(54) ADAPTIVE RESOURCE ALLOCATION FOR A WIRELESS TELECOMMUNICATION NETWORK FRONTHAUL LINK

(71) Applicant: DISH WIRELESS L.L.C., Englewood, CO (US)

(72) Inventors: Gurpreet Sohi, Parket, CO (US); Sourabh Gupta, Ashburn, VA (US); Dhaval Mehta, Aldie, VA (US)

(73) Assignee: DISH Wireless L.L.C., Englewood, CO (US)

( * ) Notice: Subject to any disclaimer, the term of this patent is extended or adjusted under 35 U.S.C. 154(b) by 468 days.

This patent is subject to a terminal disclaimer.

(21) Appl. No.: 18/094,283

(22) Filed: Jan. 6, 2023

(65) Prior Publication Data

US 2024/0114398 A1    Apr. 4, 2024

Related U.S. Application Data

(60) Provisional application No. 63/412,224, filed on Sep. 30, 2022.

(51) Int. Cl.
| | |
|---|---|
| *H04L 47/10* | (2022.01) |
| *H04L 1/00* | (2006.01) |
| *H04L 5/00* | (2006.01) |
| *H04W 28/02* | (2009.01) |
| *H04W 28/20* | (2009.01) |

(Continued)

(52) U.S. Cl.
CPC .......... *H04W 28/20* (2013.01); *H04L 1/0003* (2013.01); *H04L 5/0044* (2013.01); *H04W 28/0284* (2013.01); *H04W 72/0453* (2013.01); *H04W 88/085* (2013.01)

(58) Field of Classification Search
None
See application file for complete search history.

(56) References Cited

U.S. PATENT DOCUMENTS

| | | |
|---|---|---|
| 2019/0281501 A1 | 9/2019 | Berg et al. |
| 2021/0400527 A1 | 12/2021 | Notargiacomo et al. |

(Continued)

OTHER PUBLICATIONS

International Search Report and Written Opinion received for PCT Patent Application No. PCT/US2023/029650, mailed on Nov. 6, 2023, 9 pages.

*Primary Examiner* — Willie J Daniel, Jr.
(74) *Attorney, Agent, or Firm* — Jeremiah J. Baunach; Frontier IP Law PLLC

(57) ABSTRACT

In response to detection that a capacity of the fronthaul link has been or will be exceeded, a software intelligence layer operating on a transport layer router that aggregates network traffic from the one or more radio units (RUs) causes a change in how in-phase and quadrature (IQ) data packets sent on the fronthaul link are handled to reduce use of the capacity of the fronthaul link. In another example embodiment, a software intelligence layer operating at an application layer of the wireless telecommunication network may perform one or more actions utilizing access to scheduler level information for the distributed units (DUs) to avoid the fronthaul link exceeding the capacity limit based on incoming IQ samples to a router that aggregates network traffic from one or more corresponding RUs.

20 Claims, 12 Drawing Sheets

600 ─╮
     ╰─▶

┌────────────────────────────────────────────────────────┐  ┌─602
│ Detect that a capacity of fronthaul link has been or will be │
│                       exceeded                         │
└────────────────────────────────────────────────────────┘

┌────────────────────────────────────────────────────────┐  ┌─604
│ Cause, by a software intelligence layer operating on transport │
│ router, change in how in-phase and quadrature (IQ) data │
│ packets sent the fronthaul link are handled to reduce use of │
│                     capacity link                      │
└────────────────────────────────────────────────────────┘

(51) Int. Cl.
*H04W 72/0453* (2023.01)
*H04W 88/08* (2009.01)

(56) References Cited

U.S. PATENT DOCUMENTS

| | | |
|---|---|---|
| 2022/0110017 A1 | 4/2022 | Medeiros et al. |
| 2022/0312257 A1 | 9/2022 | Mackenzie |
| 2023/0022964 A1* | 1/2023 | Lins De Medeiros ........................ H04W 24/02 |
| 2023/0108782 A1 | 4/2023 | Kang et al. |
| 2024/0113820 A1 | 4/2024 | Sohi et al. |

* cited by examiner

ADAPTIVE RESOURCE ALLOCATION FOR A WIRELESS TELECOMMUNICATION NETWORK FRONTHAUL LINK

BRIEF SUMMARY

Fifth generation (5G) wireless technology provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

The 3GPP develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other.

The gNb incorporates three main functional modules: the Centralized Unit (CU), the Distributed Unit (DU), and the Radio Unit (RU), which can be deployed in multiple combinations and splits. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

The fronthaul (FH) link between one or more RUs and one or more corresponding DUs has a limited bandwidth which determines how many cells' in-phase and quadrature (IQ) samples can be accommodated in the FH link. For example, if all DUs utilized their full capacity at the same time this may exceed the available bandwidth of the FH link. Traditionally, there has been no dynamic or optimization solution available to maximize the utilization of FH link with multiple cells' IQ samples data transmission. Solutions to this problem are disclosed herein.

Briefly described, embodiments disclosed herein are directed to systems and methods for adaptive resource allocation for a wireless telecommunication network fronthaul link. In one example embodiment, the system may detect that a capacity of a fronthaul link between one or more DUs and one or more corresponding radio units RUs of the wireless telecommunication network has been or will be exceeded. In response to the detection that the capacity of the fronthaul link has been or will be exceeded, a software intelligence layer operating on a transport layer router that aggregates network traffic from the one or more RUs causes a change in how in-phase and quadrature (IQ) data packets sent on the fronthaul link are handled to reduce use of the capacity of the fronthaul link.

In another example embodiment, a software intelligence layer operating at an application layer of the wireless telecommunication network may perform one or more actions utilizing access to scheduler level information for the DUs to avoid the fronthaul link exceeding the capacity limit based on incoming IQ samples to a router that aggregates network traffic from one or more corresponding RUs.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems, computers and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
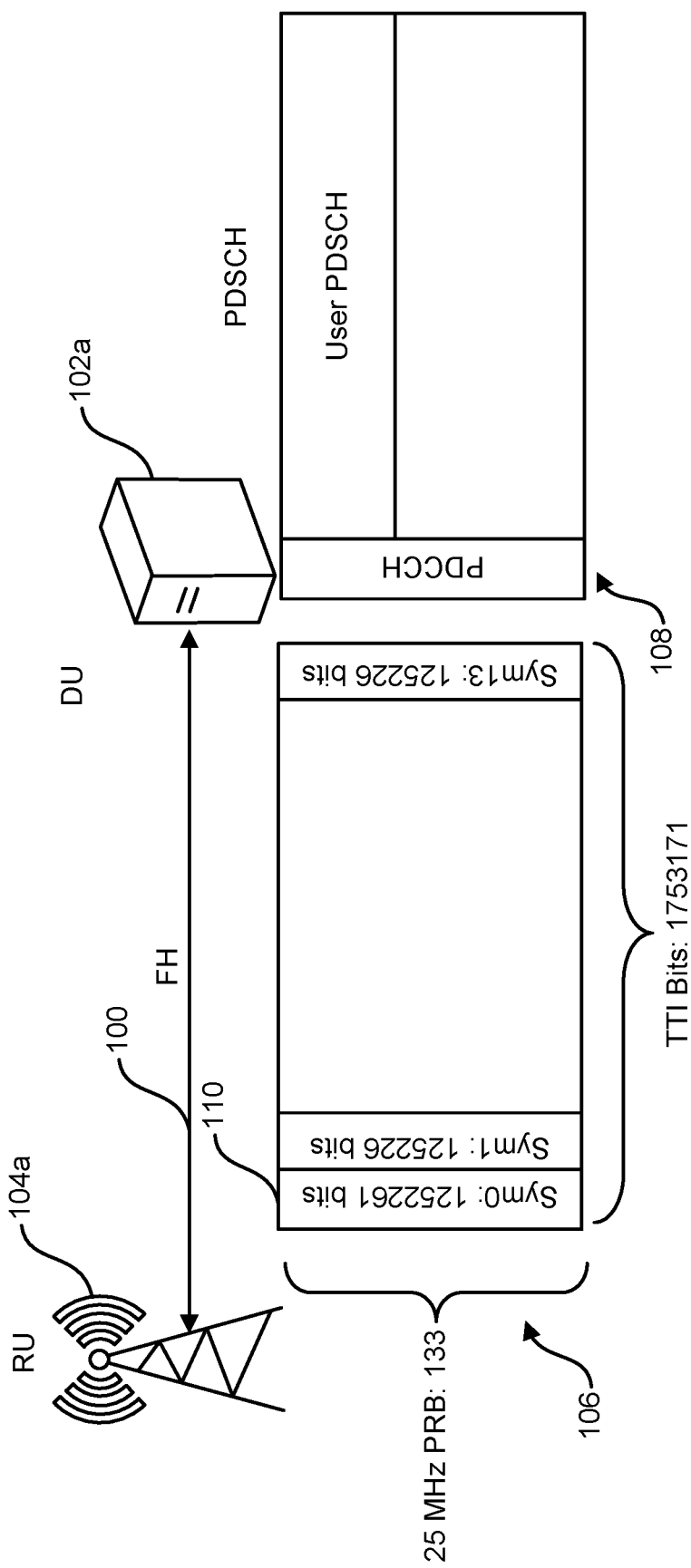
FIG. 1 illustrates a diagram of an example fronthaul (FH) link between a distributed unit (DU) and a radio unit (RU) of a fifth generation (5G) wireless telecommunication network and an example structure of a physical resource block (PRB) and associated orthogonal frequency-division multiplexing (OFDM) symbols that may be send on the FH link over a corresponding Physical Downlink Control Channel (PDCCH).

FIG. 1 illustrates a diagram of an example fronthaul (FH) link 100 between a distributed unit (DU) 102a and a radio unit (RU) 104a of a fifth generation (5G) wireless telecommunication network and an example structure of a physical resource block (PRB) 400 and associated orthogonal frequency-division multiplexing (OFDM) symbols that may be send on the FH link over a corresponding Physical Downlink Control Channel (PDCCH) 400.

Open radio access networks, such as those according to the Open RAN (O-RAN) Alliance standard specifications (O-RAN) offer the option of placing telecommunication network functions in different places along the signal path, which is referred to as a functional split. A functional split between DU 102 and RU 104a may be different depending on the specific embodiments and implementations (e.g., the O-RAN Alliance definition is Option 7.2x and Small Cell Forum is Option 6).

With O-RAN Option 7.2x deployments, the DU 102 and RU 104a provide the in-phase and quadrature (IQ) data for the downlink (DL) and uplink (UL) data on the FH link 100, respectively. The IQ samples are provided for each orthogonal frequency-division multiplexing (OFDM) symbol 110. The O-RAN standard has provided the flexibility to the DU 102 and RU 104a to include the IQ samples for all the sub-carriers in a given OFDM symbol 110 or provide the IQ data for the sub-carriers that contain user data only.

Figure 2:
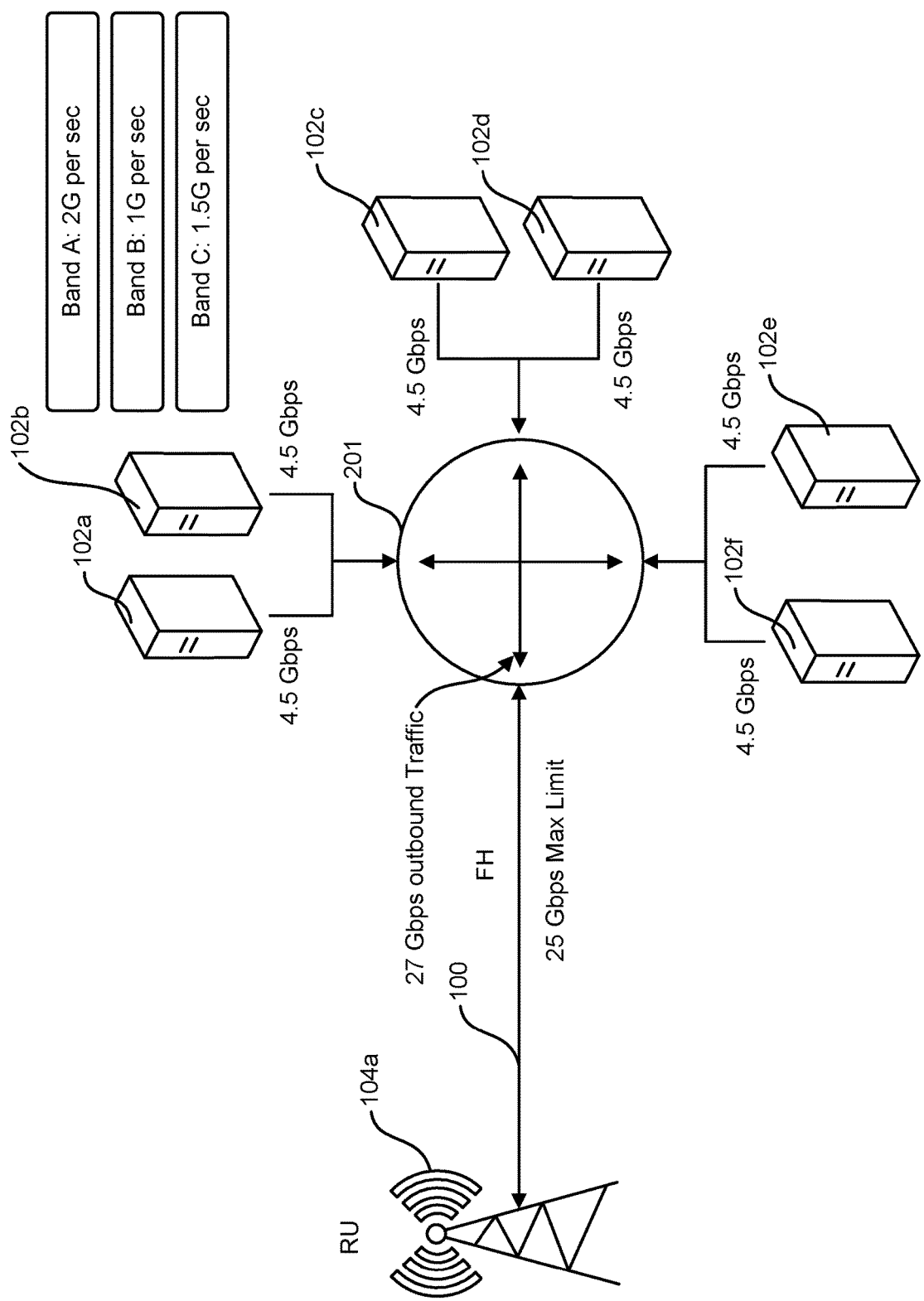
FIG. 2 illustrates an example portion of the 5G wireless telecommunication network showing connectivity between various example DUs and an example representative RU via a transport layer router over the FH link of FIG. 1.

FIG. 2 illustrates an example portion of the 5G wireless telecommunication network showing connectivity between various example DUs 102a through 102f and the example representative RU 104a via a transport layer router 201 over the FH link 100 of FIG. 1. In various embodiments, there are additional RUs connected via FH link 100 to one or more corresponding DUs.

In the present example, the FH link 100 has a limited bandwidth (e.g., 25 Gbps) which determines how many cells' IQ samples can be accommodated in the FH link 100. In the present example, each DU has the capacity to use 4.5 Gbps bandwidth. If all DUs 102a through 102f utilized their full capacity at the same time (e.g., on example Band A, Band B and Band C), this would exceed the 25 Gbps available bandwidth of the FH link 100. Conventionally, there has been no dynamic or optimization solution available to maximize the utilization of FH link 100 with multiple cells' IQ samples data transmission. Solutions to this problem are disclosed herein with reference to FIGS. 3 through 12.

Figure 3:
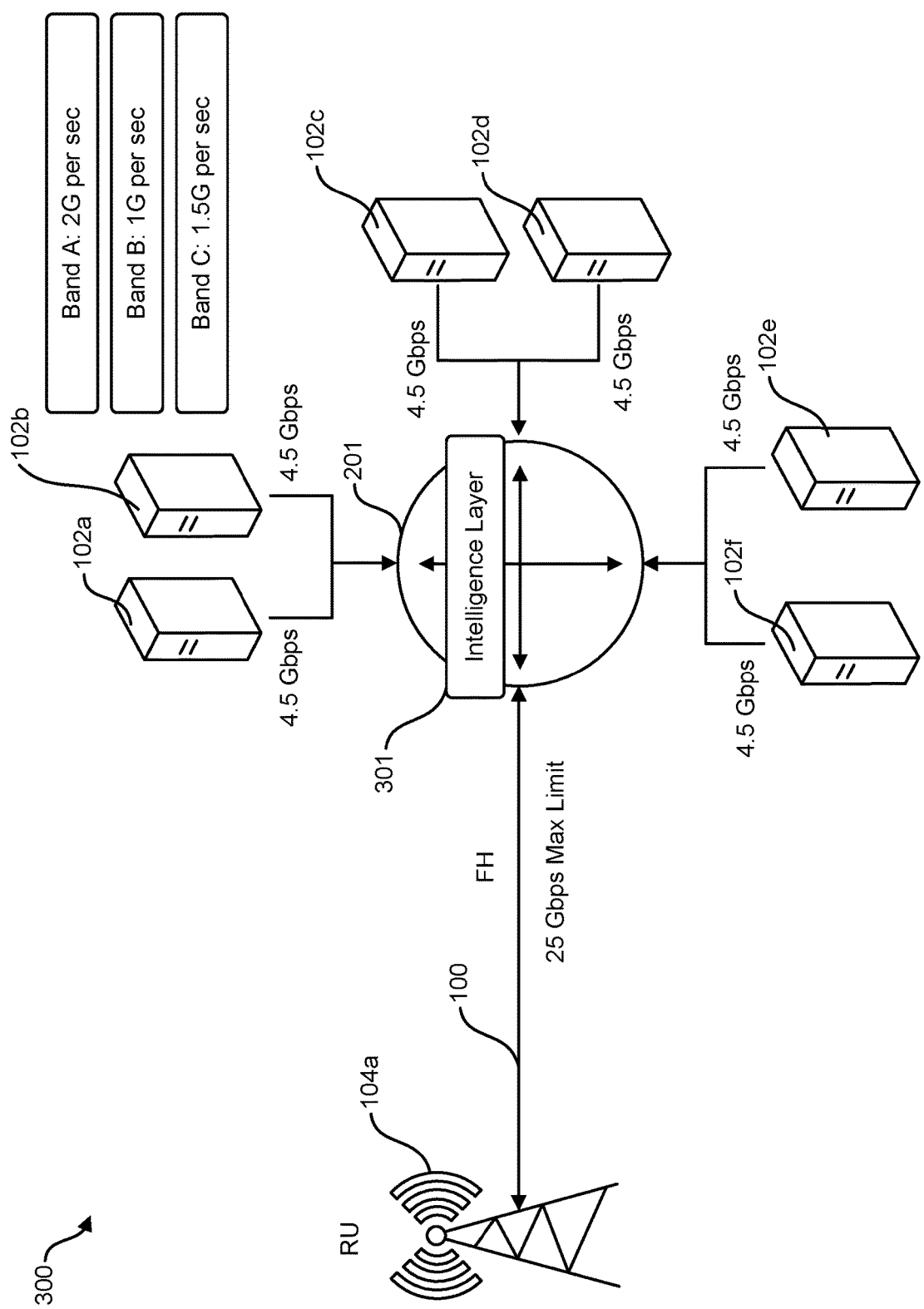
FIG. 3 illustrates an example software intelligence layer operating on a transport layer router that aggregates network traffic from the one or more RUs in accordance with embodiments described herein.

FIG. 3 illustrates a system 300 including an example software intelligence layer 301 operating on a transport layer router 201 that aggregates network traffic from the one or more RUs in accordance with embodiments described herein. In FIG. 3, there is illustrated one example representative RU 104*a*. However, in various embodiments, there are additional RUs connected via FH link 100 to one or more corresponding DUs. Thus, example representative RU 104*a* may represent multiple RUs.

The intelligence layer 301 is operating on the router 201 that is aggregating traffic from all the DUs 102*a* through 102*f*. The intelligence layer 301 can detect that the FH traffic on FH link 100 from one or more of the DUs 102*a* through 102*f* will exceed the capacity supported on the FH link 100. The intelligence layer is configured to start instructing the DUs 102*a* through 102*f* to modify the IQ data packet.

One or more of the DUs 102*a* through 102*f* may also be instructed to modify the resource allocation assignments such that they are assigned in frequency domain first and then time domain (e.g., Physical Downlink Control Channel (PDCCH) two symbols, assigned first in the frequency domain of both symbols and then increase in the time domain instead of assigning the resource in the first PDCCH symbol and then moving over to next symbol).

Figure 4:
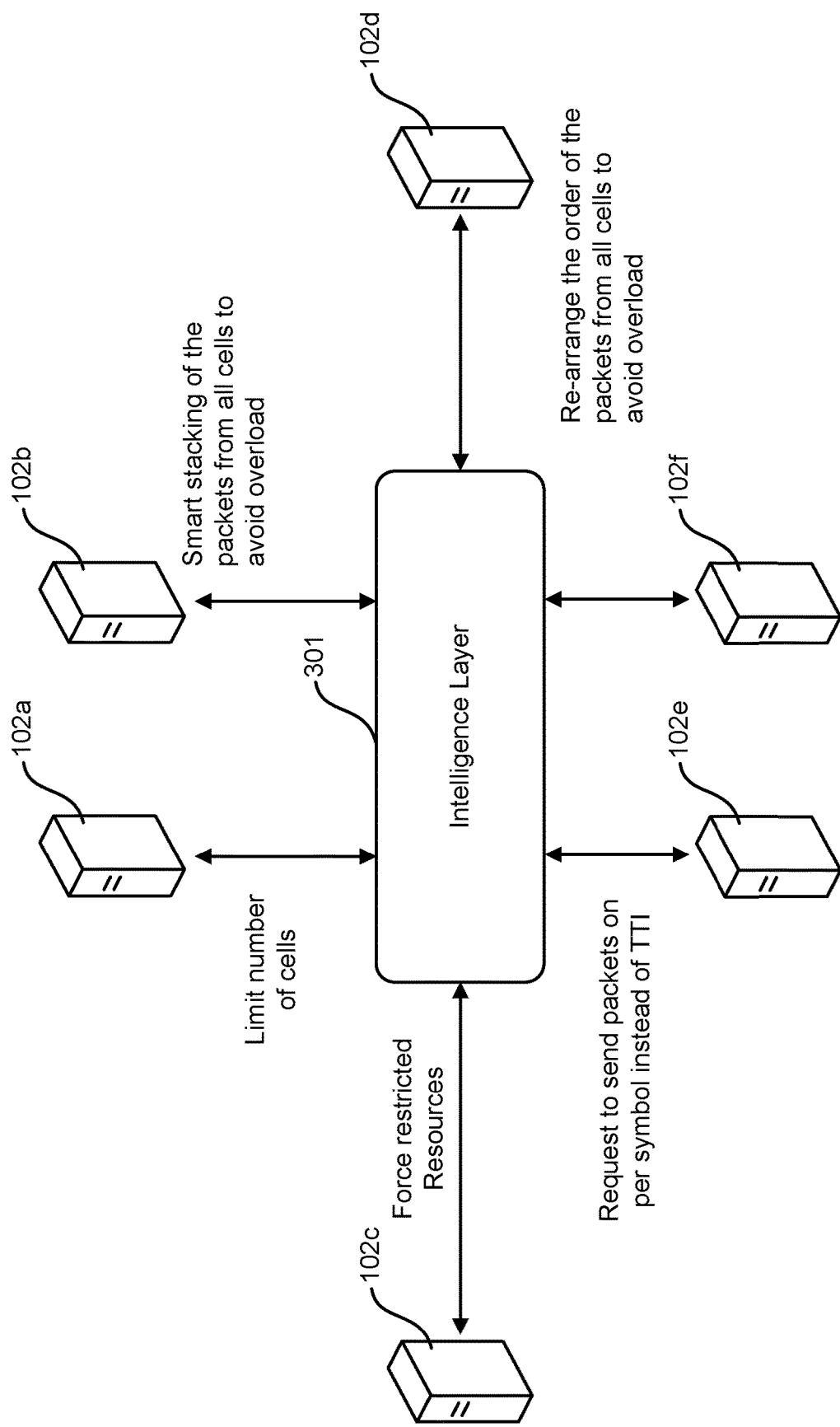
FIG. 4 illustrates the example software intelligence layer of FIG. 3 showing various techniques for changing how in-phase and quadrature (IQ) data packets sent on the fronthaul link are handled to reduce use of the capacity of the fronthaul link in accordance with embodiments described herein.

FIG. 4 illustrates the example software intelligence layer 301 of FIG. 3 showing various techniques for changing how in-phase and quadrature (IQ) data packets sent on the fronthaul link 100 are handled to reduce use of the capacity of the fronthaul link 100 in accordance with embodiments described herein.

In various example embodiments, based on the FH link capacity limit and incoming IQ samples from all the RUs and corresponding DUs, the intelligence layer 301 may be configured (but is not limited) to perform one or any combination of the following actions: force the DU to restrict a number of cells (may be based on fixed priority or based on slicing priority); stack the incoming packets from all the RUs and corresponding DUs to ensure the FH capacity limit is not exceeded; re-arrange the packets to avoid instantaneous peak capacity limit of the FH link begin exceeded; force the RU and corresponding DU to send the smaller size per symbol data; and force the DU to restrict the assigned resources to minimize the FH traffic.

Figure 5:
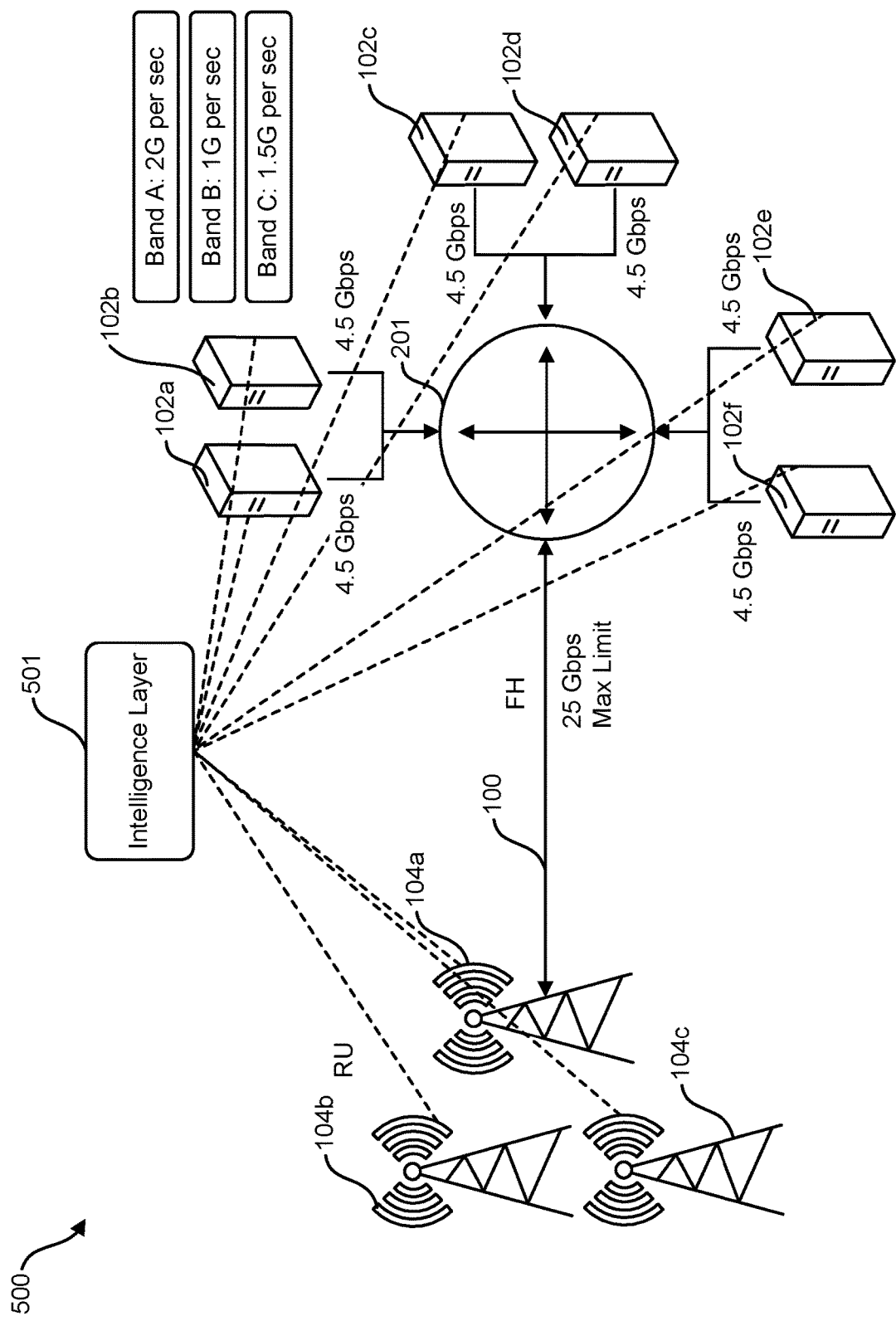
FIG. 5 illustrates an example application side software intelligence layer operating at an application layer to perform one or more actions utilizing access to scheduler level information for the DUs to avoid the fronthaul link exceeding a capacity limit in accordance with embodiments described herein.

FIG. 5 illustrates a system 500 including an example application side software intelligence layer 501 operating at an application layer to perform one or more actions utilizing access to scheduler level information for the DUs 102*a* through 102*f* to avoid the fronthaul link 100 exceeding a capacity limit in accordance with embodiments described herein.

The application side software intelligence layer 501 operates at an application layer to access to the scheduler level information for multiple DUs 102*a* through 102*f*. For example, use of such an application side software intelligence layer 501 is advantageous in an embodiment that utilizes a Cloud-RAN, also referred to as Centralized-RAN (C-RAN) in which multiple virtual DUs (vDUs) are co-located, and the Transmission Time Intervals (TTI) level scheduling information can be exchanged between the vDUs.

In various example embodiments, based on the FH link 100 capacity limit and incoming IQ samples from all the different RUs 104*a*, 104*b*, 104*c* and one or more corresponding DUs 102*a* through 102*f*, the application side software intelligence layer 501 is configured (but not limited) to perform one or any combination of the following actions.

At a per DU level, the application side software intelligence layer 501 may direct/handover the calls from one cell to the others (e.g., from a cell transmitted by RU 104*b* to a cell transmitted by RU 104*s*) to drain all traffic from that cell so the Control and User Plane data on FH link 100 can be reduced.

The application side software intelligence layer 501 may also or instead leverage advanced techniques like Coordinated Multi-Point transmission and reception (CoMP) to provide better channel estimation by combining signals received from adjacent cell sites and provide better Modulation and Coding Scheme (MCS). With better MCS assignment, fewer physical resource blocks (PRBs) can be assigned to a user to support same QoS, hence reducing the fronthaul bandwidth usage.

To limit FH BW usage on UL, the application side software intelligence layer 501 may coordinate timing between the different RUs (e.g., RUs 104*a*, 104*b*, 104*c*) and direct them to perform measurements across all PRBs at different times to limit the peak UL FH network traffic. These measurements are helpful for noise/interference calculations.

The application side software intelligence layer 501 may also or instead help reduce the Control Plane (C-Plane) data volume (C-Plane traffic shows characteristics of the User Plane (U-Plane) data). The C-Plane data does not need to be sent every OFDM symbol, but could be sent after some number of TTIs and could be sent at different times to limit the peak FH traffic. As an example, if C-Plane traffic is sent every 5 TTIs (5 ms), this may help reduce the C-Plane overhead by 5×14 symbols=70 times.

The application side software intelligence layer 501 may also or instead cause exchange of non-service impacting data, e.g., telemetry data (fault monitoring (FM), performance monitoring (PM), and Logs) on the FH link 100 to be avoided during peak network traffic times on the FH link 100. In an example embodiment, the application side software intelligence layer 501 may direct the RUs 104*a*, 104*b*, 104*c* to keep collecting the telemetry data and send only when there is bandwidth available on the FH link 100.

Figure 6:
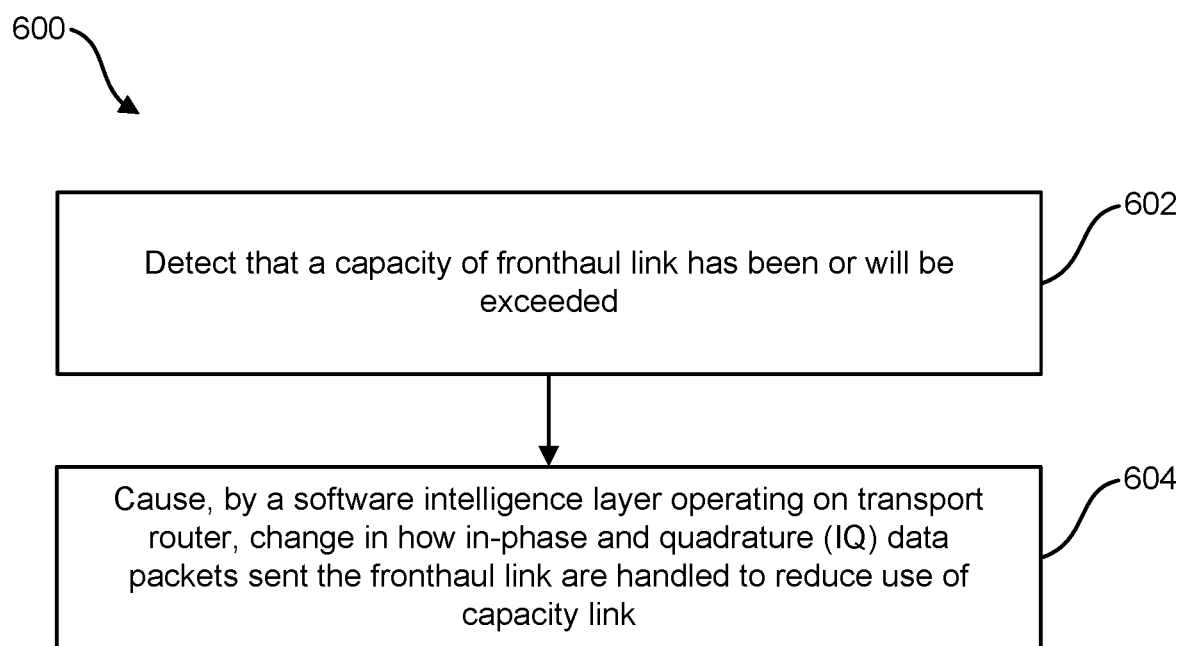
FIG. 6 illustrates a logical flow diagram showing an example embodiment of a process for reducing use of the capacity of the fronthaul link using a software intelligence layer operating on a transport layer router in accordance with embodiments described herein.

FIG. 6 illustrates a logical flow diagram showing an example embodiment of a process 600 for reducing use of the capacity of the fronthaul link using a software intelligence layer operating on a transport layer router in accordance with embodiments described herein.

At 602, the system detects that a capacity of a fronthaul link between one or more distributed units (DUs) and one or more radio units (RUs) of the wireless telecommunication network has been or will be exceeded.

At 604, in response to the detection that the capacity of the fronthaul link has been or will be exceeded, a software intelligence layer operating on a transport layer router that aggregates network traffic from the one or more RUs causes a change in how in-phase and quadrature (IQ) data packets sent on the fronthaul link are handled to reduce use of the capacity of the fronthaul link. For example, the software intelligence layer may instruct at least one DU of the one or more DUs to modify IQ data packets sent by the at least one DU on the fronthaul link to reduce use of the capacity of the fronthaul link.

Figure 7:
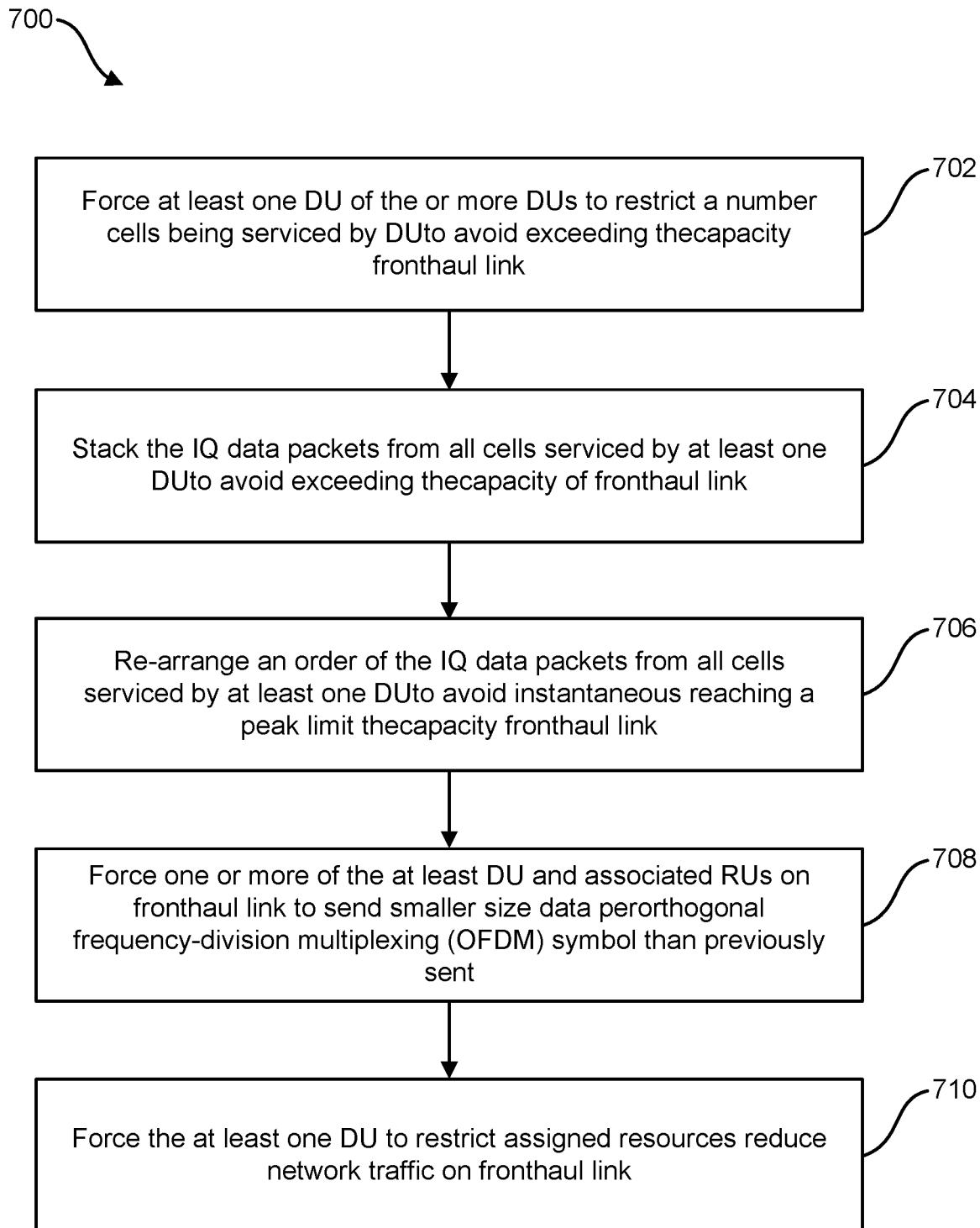
FIG. 7 illustrates a logical flow diagram showing an example embodiment of a process including various techniques for changing how IQ data packets sent on a fronthaul link are handled to reduce use of the capacity of the fronthaul link in accordance with embodiments described herein.

FIG. 7 illustrates a logical flow diagram showing an example embodiment of a process 700 including various techniques for changing how IQ data packets sent on a fronthaul link are handled to reduce use of the capacity of the fronthaul link in accordance with embodiments described herein.

At 702, the intelligence layer operating on a transport layer router may force at least one DU of the one or more DUs to restrict a number of cells being serviced by the at least one DU to avoid exceeding the capacity of the fronthaul link;

At 704, the intelligence layer may also or instead stack the IQ data packets from all cells serviced by the at least one DU to avoid exceeding the capacity of the fronthaul link.

At 706, the intelligence layer may also or instead re-arrange an order of the IQ data packets from all cells serviced by the at least one DU to avoid an instantaneous reaching of a peak limit of the capacity of the fronthaul link.

At 708, the intelligence layer may also or instead force one or more of the at least one DU and one or more associated RUs on the fronthaul link to send smaller size data per orthogonal frequency-division multiplexing (OFDM) symbol than previously sent.

At 710, the intelligence layer may also or instead force the at least one DU to restrict assigned resources to reduce the network traffic on the fronthaul link.

In various embodiments, the intelligence layer may perform one or more, any combination of, the above actions above of process 700 in various different orders.

Figure 8:
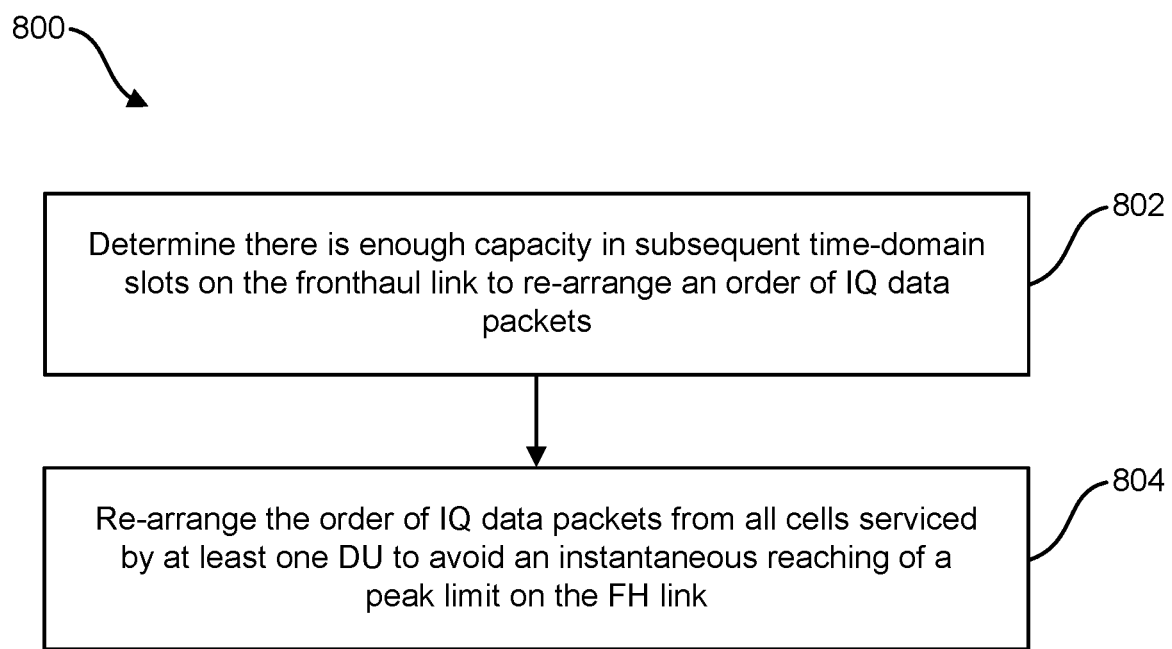
FIG. 8 illustrates a logical flow diagram showing an example embodiment of a process to avoid an instantaneous reaching of a peak limit of the capacity of the fronthaul link in accordance with embodiments described herein.

FIG. 8 illustrates a logical flow diagram showing an example embodiment of a process 800 to avoid an instantaneous reaching of a peak limit of the capacity of the fronthaul link in accordance with embodiments described herein.

At 802, the intelligence layer determines there is enough capacity in subsequent time-domain slots on the fronthaul link to re-arrange an order of the IQ data packets from all cells serviced by the at least one DU to avoid an instantaneous reaching of a peak limit of the capacity of the fronthaul link.

At 804, the intelligence layer, in response to determining there is enough capacity in subsequent time-domain slots on the fronthaul link, re-arranges the order of the IQ data packets from all cells serviced by the at least one DU to avoid an instantaneous reaching of a peak limit of the capacity of the fronthaul link to an extent latency budgets of corresponding RUs transmitting the cells are not exceeded.

In various embodiments, an intelligence layer operating on a transport layer router may also or instead instruct at least one DU of the one or more DUs to modify allocation assignments for IQ data packets provided for OFDM symbols such that IQ data packets sent by the at least one DU are assigned in a frequency domain first and then in a time domain to reduce use of the capacity of the fronthaul link. For example, the intelligence layer may instruct the at least one DU to modify allocation assignments for IQ data packets such that the IQ data packets sent by the at least one DU are each split between at least two corresponding Physical Downlink Control Channel (PDCCH) OFDM symbols in a time domain to reduce use of the capacity of the fronthaul link.

In some embodiments, the intelligence layer operating on the transport layer router may also or instead force at least one DU of the one or more DUs to restrict a number of cells being serviced by the at least one DU to avoid exceeding the capacity of the fronthaul link based on one or more of: network slicing priority and fixed cell priority.

Figure 9:
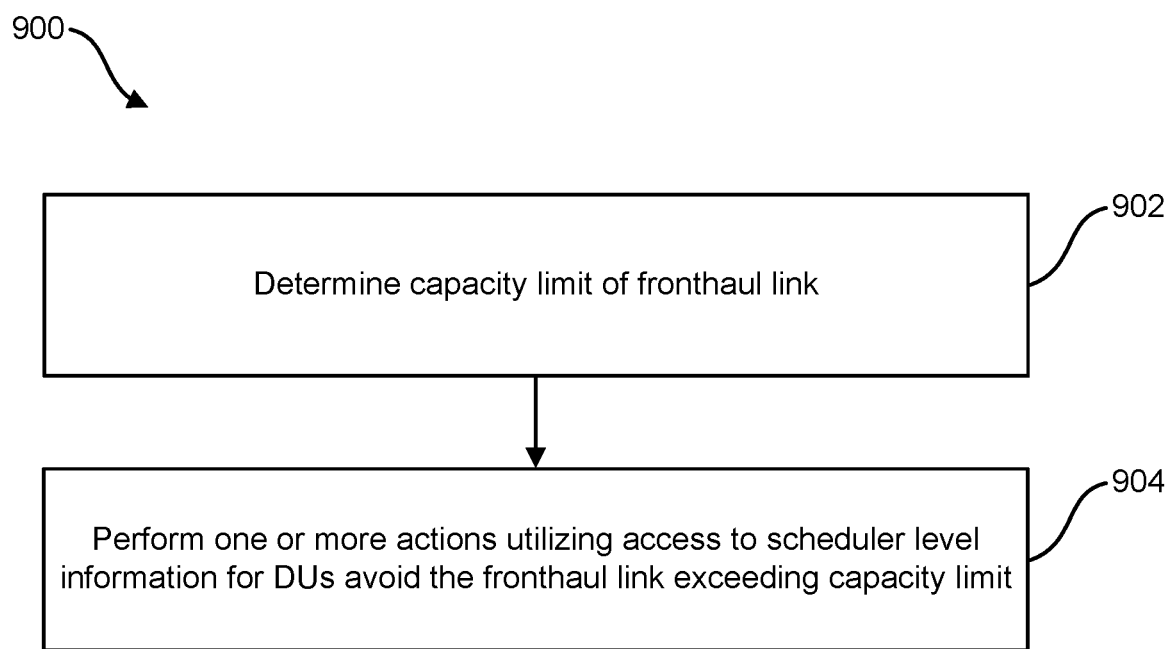
FIG. 9 illustrates a logical flow diagram showing an example embodiment of a process for reducing use of the capacity of the fronthaul link using a software intelligence layer operating at an application layer of the wireless telecommunication network in accordance with embodiments described herein.

FIG. 9 illustrates a logical flow diagram showing an example embodiment of a process 900 for reducing use of the capacity of the fronthaul link using a software intelligence layer operating at an application layer of the wireless telecommunication network in accordance with embodiments described herein.

At 902, the system determines a capacity limit of a fronthaul link between one or more distributed units (DUs) and one or more radio units (RUs) of the wireless telecommunication network.

At 904, a software intelligence layer operating at an application layer of the wireless telecommunication network performs one or more actions utilizing access to scheduler level information for the one or more DUs to avoid the fronthaul link exceeding the capacity limit based on incoming in-phase and quadrature (IQ) samples to a router that aggregates network traffic from the one or more RUs. In an example embodiment, the intelligence layer communicates with the one or more DUs over a fifth generation (5G) Radio access Network (RAN) E2 interface. Also, in various embodiments, the intelligence layer may be operating on hardware at a same data center as the one or more DUs (i.e., co-located with the one or more DUs).

Figure 10:
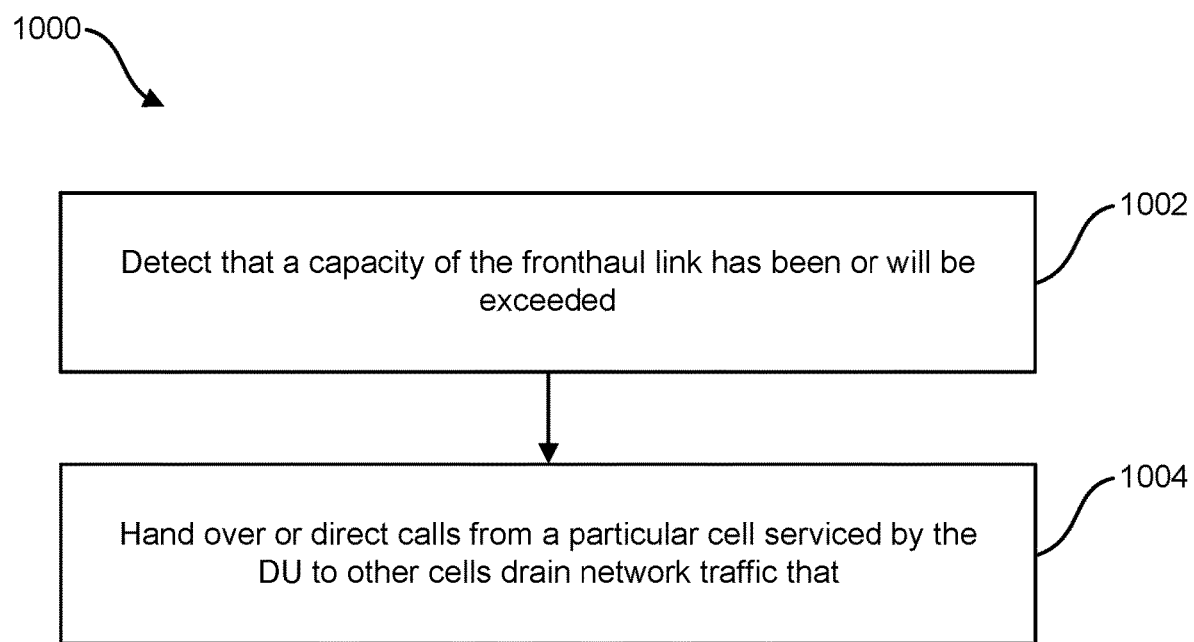
FIG. 10 illustrates a logical flow diagram showing an example embodiment of a process for reducing use of the capacity of the fronthaul link by handing over or directing calls from a particular cell to other cells in accordance with embodiments described herein.

FIG. 10 illustrates a logical flow diagram showing an example embodiment of a process 1100 for reducing use of the capacity of the fronthaul link by handing over or directing calls from a particular cell to other cells in accordance with embodiments described herein.

At 1002, the system detects that a capacity of the fronthaul link has been or will be exceeded; and At 1004, a software intelligence layer operating at an application layer of the wireless telecommunication network, in response to detecting that the capacity of the fronthaul link has been or will be exceeded, per each of at least one DU of the one or more DUs, hands over or directing calls from a particular cell serviced by the DU to other cells serviced by the DU to drain network traffic from that particular cell such that control plane and user plane data on the fronthaul link is reduced to avoid the fronthaul link exceeding the capacity limit.

Figure 11:
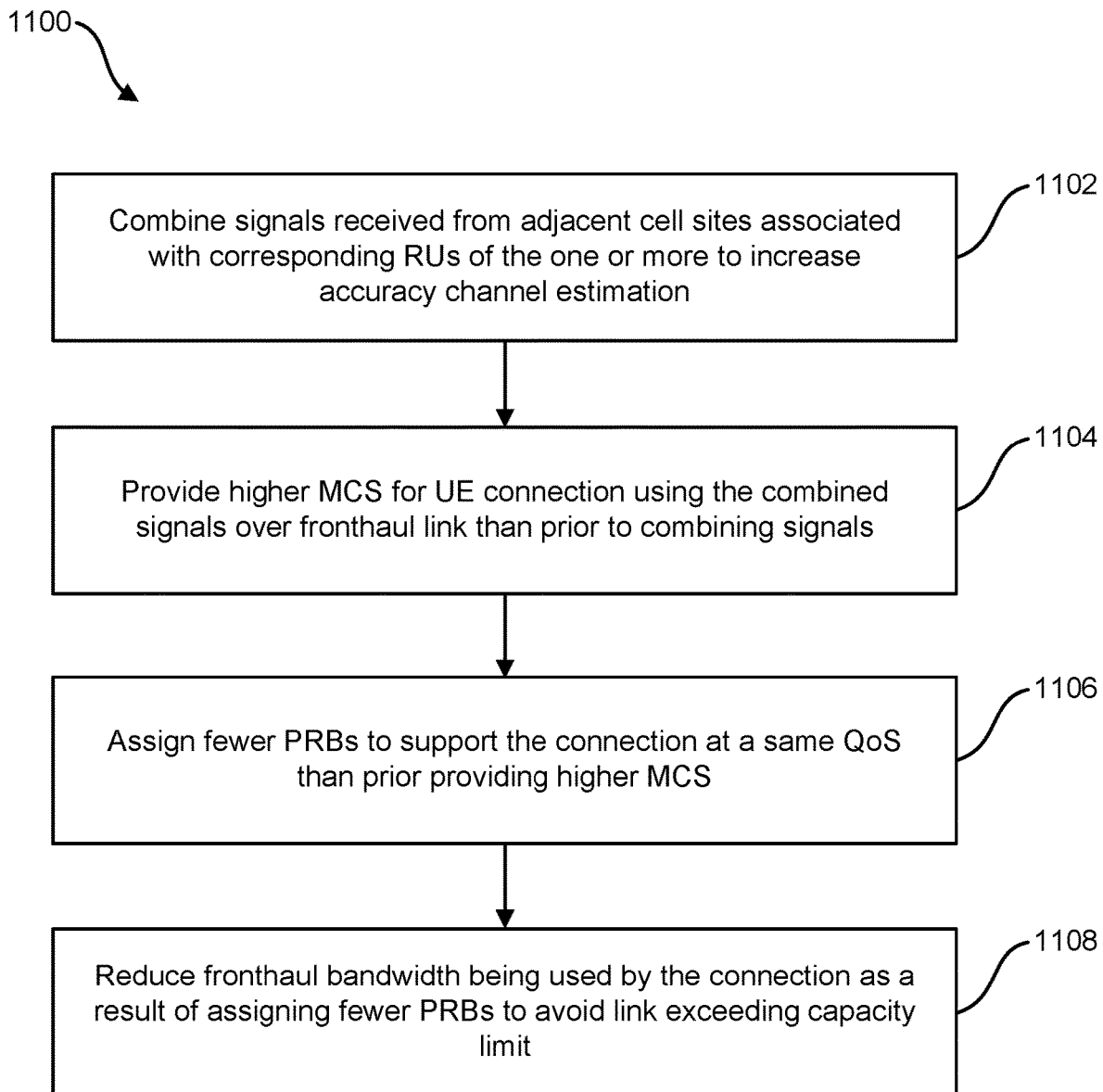
FIG. 11 illustrates a logical flow diagram showing an example embodiment of a process including various techniques to reduce use of the capacity of the fronthaul link by using a software intelligence layer operating at an application layer of the wireless telecommunication network in accordance with embodiments described herein.

FIG. 11 illustrates a logical flow diagram showing an example embodiment of a process 1100 including various techniques to reduce use of the capacity of the fronthaul link by using a software intelligence layer operating at an application layer of the wireless telecommunication network in accordance with embodiments described herein.

A software intelligence layer operating at an application layer of a wireless telecommunication network, in order to avoid the fronthaul link of the wireless telecommunication network exceeding the capacity limit may perform one or more, or any combination of, the following actions:

At 1102, the intelligence layer may combine signals received from adjacent cell sites associated with corresponding RUs of the one or more RUs to increase accuracy of channel estimation. In an example embodiment, the combining of signals received from adjacent cell sites includes utilizing a Coordinated Multi-Point transmission and reception (CoMP) technique for the adjacent cell sites to avoid the fronthaul link exceeding the capacity limit. The intelligence layer may determine whether DUs servicing the corresponding RUs are co-located. In response to a determination that the DUs servicing the corresponding RUs are co-located, the intelligence layer may perform the combining of signals received from adjacent cell sites and the providing the higher MCS.

At 1104, the intelligence layer may provide higher Modulation and Coding Scheme (MCS) for a user equipment (UE) connection using the combined signals over the fronthaul link than prior to combining the signals.

At 1106, the intelligence layer may assign fewer physical resource blocks (PRBs) to support the connection at a same quality of service (QoS) than prior to providing the higher MCS.

At 1108, the intelligence layer may reduce fronthaul bandwidth being used by the connection as a result of the assigning of fewer PRBs to avoid the fronthaul link exceeding the capacity limit.

In various example embodiments, in order to avoid the fronthaul link exceeding the capacity limit, the intelligence layer may coordinate timing between the one or more RUs for sending IQ data on the fronthaul link including directing each of the one or more RUs to perform radio spectrum measurements across all physical resource blocks (PRBs) associated with connections from the one or more RUs at different times to limit fronthaul link bandwidth use and peak uplink (UL) network traffic on the fronthaul link. For example, the coordinating timing between the one or more RUs for sending IQ data on the fronthaul link may include each RU of the one or more RUs sending respective IQ data at different times in different orthogonal frequency-division multiplexing (OFDM) symbols on the fronthaul link. The radio spectrum measurements may include measurements for performing noise and interference calculations for determining PRB allocations to user equipment (UE) connecting to the wireless telecommunication network via the one or more RUs.

Also, in order to avoid the fronthaul link exceeding the capacity limit, the intelligence layer may reduce control plane (c-plane) data volume on the fronthaul link by at least causing the c-plane data to not be sent at every OFDM symbol, but instead cause the c-plane data to be sent from respective DUs of the one or more DUs at a number of Transmission Time Intervals (TTIs) to limit peak fronthaul link network traffic. For example, the number of TTIs at which the c-plane data is caused to be sent may be every 5 TTIs.

In various example embodiments, in order to avoid the fronthaul link exceeding the capacity limit the intelligence layer may perform: directing the one or more RUs to avoid sending non-service impacting data over the fronthaul link during peak fronthaul link network traffic times; directing the one or more RUs to keep collecting and storing the non-service impacting data during the peak fronthaul link network traffic times; and directing the one or more RUs to send the collected non-service impacting data only when there is bandwidth available on the fronthaul link. The non-service impacting data may include telemetry data regarding one or more of: quality of service provided by the one or more RUs and quality of service provided by the one or more DUs. In various example embodiments, the telemetry data may include one or more of fault monitoring data, performance monitoring data and logs.

The intelligence layer may cause one or more, or any combination of, the above actions to be performed.

Figure 12:
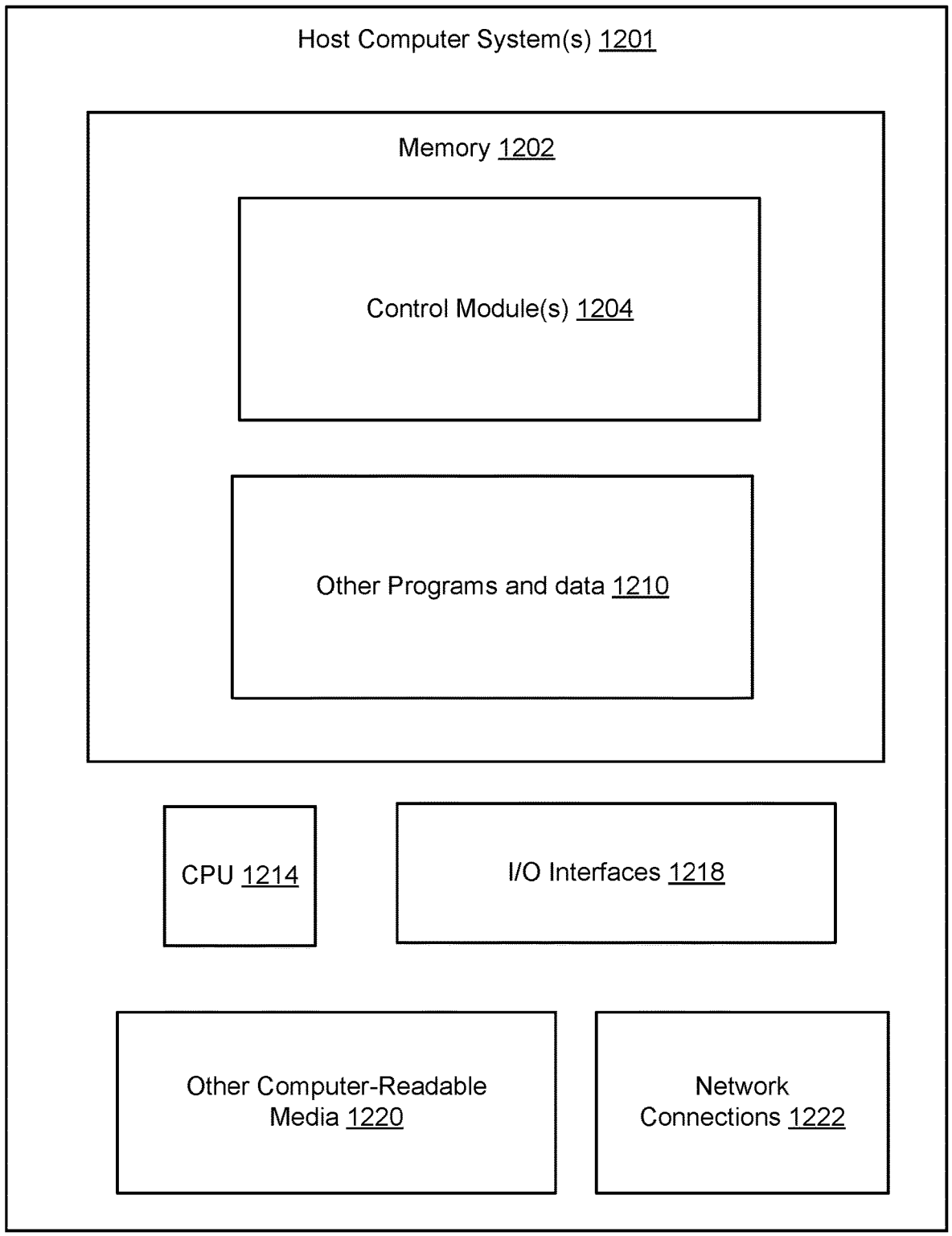
FIG. 12 shows a system diagram that describes an example implementation of a computing system(s) for implementing embodiments described herein.

FIG. 12 shows a system diagram that describes an example implementation of a computing system(s) for implementing embodiments described herein.

The functionality described herein for adaptive resource allocation for a wireless telecommunication network fronthaul link can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 12 illustrates an example of underlying hardware on which such software and functionality may be hosted and/or implemented.

In particular, shown is example host computer system(s) 1201. For example, such computer system(s) 1201 may represent one or more of those in various data centers, base stations and cell sites shown and/or described herein that are, or that host or implement the functions of: routers, components, microservices, nodes, node groups, control planes, clusters, virtual machines, NFs, intelligence layers, orchestrators and/or other aspects described herein, as applicable, for adaptive resource allocation for a wireless telecommunication network fronthaul link. In some embodiments, one or more special-purpose computing systems may be used to implement the functionality described herein. Accordingly, various embodiments described herein may be implemented in software, hardware, firmware, or in some combination thereof. Host computer system(s) 1201 may include memory 1202, one or more central processing units (CPUs) 1214, I/O interfaces 1218, other computer-readable media 1220, and network connections 1222.

Memory 1202 may include one or more various types of non-volatile and/or volatile storage technologies. Examples of memory 1202 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1202 may be utilized to store information, including computer-readable instructions that are utilized by CPU 1214 to perform actions, including those of embodiments described herein.

Memory 1202 may have stored thereon control module(s) 1204. The control module(s) 1204 may be configured to implement and/or perform some or all of the functions of the systems, components and modules described herein for adaptive resource allocation for a wireless telecommunication network fronthaul link. Memory 1202 may also store other programs and data 1210, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 1222 are configured to communicate with other computing devices to facilitate the functionality described herein. In various embodiments, the network connections 1222 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1218 may include a video interfaces, other data input or output interfaces, or the like. Other computer-readable media 1220 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a wireless telecommunication network, the method comprising:
   determining a capacity limit of a fronthaul link between one or more distributed units (DUs) and one or more radio units (RUs) of the wireless telecommunication network; and
   a software intelligence layer operating at an application layer of the wireless telecommunication network, wherein the one or more DUs are one or more virtual DUs (vDUs) and the telecommunication network utilizes a Cloud-RAN which the one or more vDUs are co-located, the software intelligence layer operating at an application layer of the wireless telecommunication network that utilizes the Cloud-RAN performing one or more actions utilizing access to scheduler level information for the one or more DUs to avoid the fronthaul link exceeding the capacity limit based on incoming in-phase and quadrature (IQ) samples to a router that aggregates network traffic from the one or more RUs.

2. The method of claim 1 wherein the one or more actions includes:
   detecting that a capacity of the fronthaul link has been or will be exceeded; and
   in response to detecting that the capacity of the fronthaul link has been or will be exceeded, per each of at least one DU of the one or more DUs, handing over or directing calls from a particular cell serviced by the DU to other cells serviced by the DU to drain network traffic from that particular cell such that control plane and user plane data on the fronthaul link is reduced to avoid the fronthaul link exceeding the capacity limit.

3. The method of claim 1 wherein the one or more actions includes one or more of:
   in order to avoid the fronthaul link exceeding the capacity limit:
   combining signals received from adjacent cell sites associated with corresponding RUs of the one or more RUs to increase accuracy of channel estimation;
   providing higher Modulation and Coding Scheme (MCS) for a user equipment (UE) connection using the combined signals over the fronthaul link than prior to combining the signals;
   assigning fewer physical resource blocks (PRBs) to support the connection at a same quality of service (QOS) than prior to providing the higher MCS; and
   reducing fronthaul bandwidth being used by the connection as a result of the assigning of fewer PRBs to avoid the fronthaul link exceeding the capacity limit.

4. The method of claim 3 wherein the combining signals received from adjacent cell sites includes utilizing a Coordinated Multi-Point transmission and reception (CoMP) technique for the adjacent cell sites to avoid the fronthaul link exceeding the capacity limit.

5. The method of claim 3 further comprising:
   determining whether DUs servicing the corresponding RUs are co-located; and
   in response to a determination that the DUs servicing the corresponding RUs are co-located, performing the combining signals received from adjacent cell sites and the providing the higher MCS.

6. The method of claim 1 wherein the one or more actions includes:
   in order to avoid the fronthaul link exceeding the capacity limit:
   coordinating timing between the one or more RUs for sending IQ data on the fronthaul link including directing each of the one or more RUs to perform radio spectrum measurements across all physical resource blocks (PRBs) associated with connections from the one or more RUs at different times to limit fronthaul link bandwidth use and peak uplink (UL) network traffic on the fronthaul link.

7. The method of claim 6 wherein the coordinating timing between the one or more RUs for sending IQ data on the fronthaul link includes each RU of the one or more RUs sending respective IQ data at different times in different orthogonal frequency-division multiplexing (OFDM) symbols on the fronthaul link.

8. The method of claim 6 wherein the radio spectrum measurements include measurements for performing noise and interference calculations for determining PRB allocations to user equipment (UE) connecting to the wireless telecommunication network via the one or more RUs.

9. The method of claim 1 wherein the one or more actions includes:
   in order to avoid the fronthaul link exceeding the capacity limit:
   reducing control plane (c-plane) data volume on the fronthaul link by at least causing the c-plane data to not be sent at every OFDM symbol, but instead causing the c-plane data to be sent from respective DUs of the one or more DUs at a number of Transmission Time Intervals (TTIs) to limit peak fronthaul link network traffic.

10. The method of claim 9 wherein the number of TTIs at which the c-plane data is caused to be sent is every 5 TTIs.

11. The method of claim 1 wherein the one or more actions includes:
   in order to avoid the fronthaul link exceeding the capacity limit:
   directing the one or more RUs to avoid sending non-service impacting data over the fronthaul link during peak fronthaul link network traffic times;
   directing the one or more RUs to keep collecting and storing the non-service impacting data during the peak fronthaul link network traffic times; and
   directing the one or more RUs to send the collected non-service impacting data only when there is bandwidth available on the fronthaul link.

12. The method of claim 11 wherein the non-service impacting data includes telemetry data regarding one or more of: quality of service provided by the one or more RUs and quality of service provided by the one or more DUs.

13. The method of claim 12 wherein the telemetry data includes one or more of fault monitoring data, performance monitoring data and logs.

14. The method of claim 1 wherein the intelligence layer is operating on hardware at a same data center as the one or more DUs.

15. The method of claim 1 wherein the intelligence layer communicates with the one or more DUs over a fifth generation (5G) Radio access Network (RAN) E2 interface.

16. A system comprising:
   at least one processor; and
   at least one memory coupled to the at least one processor having computer-executable instructions stored thereon which, when executed by the at least one processor, causes operations to be performed, the operations including:

determining a capacity limit of a fronthaul link between one or more distributed units (DUs) and one or more radio units (RUs) of the wireless telecommunication network; and a software intelligence layer operating at an application layer of the wireless telecommunication network, wherein the one or more DUs are one or more virtual DUs (vDUs) and the telecommunication network utilizes a Cloud-RAN which the one or more vDUs are co-located, the software intelligence layer operating at an application layer of the wireless telecommunication network that utilizes the Cloud-RAN performing one or more actions utilizing access to scheduler level information for the one or more DUs to avoid the fronthaul link exceeding the capacity limit based on incoming in-phase and quadrature (IQ) samples to a router that aggregates network traffic from the one or more RUs.

17. The system of claim 16 wherein the one or more actions includes:

detecting that a capacity of the fronthaul link has been or will be exceeded; and in response to detecting that the capacity of the fronthaul link has been or will be exceeded, per each of at least one DU of the one or more DUs, handing over or directing calls from a particular cell serviced by the DU to other cells serviced by the DU to drain network traffic from that particular cell such that control plane and user plane data on the fronthaul link is reduced to avoid the fronthaul link exceeding the capacity limit.

18. The system of claim 16 wherein the one or more actions includes one or more of:

in order to avoid the fronthaul link exceeding the capacity limit:

combining signals received from adjacent cell sites associated with corresponding RUs of the one or more RUs to increase accuracy of channel estimation;

providing higher Modulation and Coding Scheme (MCS) for a user equipment (UE) connection using the combined signals over the fronthaul link than prior to combining the signals;

assigning fewer physical resource blocks (PRBs) to support the connection at a same quality of service (QOS) than prior to providing the higher MCS; and reducing fronthaul bandwidth being used by the connection as a result of the assigning of fewer PRBs to avoid the fronthaul link exceeding the capacity limit.

19. A non-transitory computer-readable storage medium having computer-executable instructions stored thereon which, when executed by at least one processor, causes operations to be performed, the operations including:

determining a capacity limit of a fronthaul link between one or more distributed units (DUs) and one or more radio units (RUs) of the wireless telecommunication network; and a software intelligence layer operating at an application layer of the wireless telecommunication network, wherein the one or more DUs are one or more virtual DUs (vDUs) and the telecommunication network utilizes a Cloud-RAN which the one or more vDUs are co-located, the software intelligence layer operating at an application layer of the wireless telecommunication network that utilizes the Cloud-RAN performing one or more actions utilizing access to scheduler level information for the one or more DUs to avoid the fronthaul link exceeding the capacity limit based on incoming in-phase and quadrature (IQ) samples to a router that aggregates network traffic from the one or more RUs.

20. The non-transitory computer-readable storage medium of claim 19 wherein the one or more actions includes:

detecting that a capacity of the fronthaul link has been or will be exceeded; and in response to detecting that the capacity of the fronthaul link has been or will be exceeded, per each of at least one DU of the one or more DUs, handing over or directing calls from a particular cell serviced by the DU to other cells serviced by the DU to drain network traffic from that particular cell such that control plane and user plane data on the fronthaul link is reduced to avoid the fronthaul link exceeding the capacity limit.

\* \* \* \* \*